(12) United States Patent
Mercer (10) Patent No.: US 6,547,830 B1
(45) Date of Patent: Apr. 15, 2003

(54) METHODS AND APPARATUSES FOR DISPLAY AND TRAVERSING OF LINKS IN PAGE CHARACTER ARRAY

(75) Inventor: Paul Mercer, Palo Alto, CA (US)

(73) Assignee: Pixo, Inc., Cupertino, CA (US)

( * ) Notice: Subject to any disclaimer, the term of this patent is extended or adjusted under 35 U.S.C. 154(b) by 0 days.

(21) Appl. No.: 09/374,228

(22) Filed: Aug. 13, 1999

(51) Int. Cl.⁷ .............................................. G06F 15/00
(52) U.S. Cl. ...................... 715/518; 715/519; 715/531; 345/788; 455/575
(58) Field of Search .................... 707/513, 501, 707/518, 519, 526, 529, 531, 540; 345/342, 788; 455/555, 556, 557, 90, 575; 715/501.1, 518, 519, 531

(56) References Cited

U.S. PATENT DOCUMENTS

| | | | |
|---|---|---|---|
| 4,608,664 A | * 8/1986 | Barlett et al. ................ | 707/521 |
| 5,068,809 A | * 11/1991 | Verhelst et al. ............. | 707/515 |
| 5,388,194 A | * 2/1995 | Vogel ......................... | 707/519 |
| 5,416,898 A | * 5/1995 | Opstad et al. ............... | 707/518 |
| 5,452,380 A | * 9/1995 | Uehara et al. ............... | 345/128 |
| 5,555,363 A | * 9/1996 | Tou et al. .................... | 345/863 |
| 5,613,017 A | * 3/1997 | Rao et al. .................... | 382/174 |
| 5,724,596 A | * 3/1998 | Lathrop ....................... | 395/781 |
| 5,740,456 A | * 4/1998 | Harel et al. .................. | 707/519 |
| 5,751,283 A | * 5/1998 | Smith ........................... | 345/342 |
| 5,778,403 A | * 7/1998 | Bangs ........................... | 707/527 |
| 5,787,452 A | * 7/1998 | McKenna .................... | 707/536 |
| 5,825,919 A | * 10/1998 | Bloomberg et al. ......... | 382/177 |
| 5,859,648 A | * 1/1999 | Moore et al. ................ | 345/471 |
| 5,893,127 A | * 4/1999 | Tyan et al. ................... | 707/513 |
| 6,212,412 B1 | * 4/2001 | Rogers et al. ............... | 455/575 |

OTHER PUBLICATIONS

Simpson, Mastering WordPerfect 5.1&5.2 for Windows, 1993, Sybex Inc., p. 954.*
Shaw et al., Microsoft Office 6–in–1, 1994, Que Corporation, pp. 437–438.*
daVinci, Layout Dimensions Window, Jun. 15, 1998, Online document, pp. 1–2.*

* cited by examiner

Primary Examiner—Heather R. Herndon
Assistant Examiner—Cong-Lac Huynh
(74) Attorney, Agent, or Firm—Fliesler Dubb Meyer & Lovejoy LLP (57) ABSTRACT

A device, such as a cellular telephone, having a software program for maximizing the amount of text displayed is provided. The software program converts a markup language page, such as a hypertext markup language page from the internet, or ASCII file, to easily viewable text which may be provided to small displays. The software program includes a method to reduce the displayed distance between characters, both horizontally and vertically. The software program also includes a method which proportionately reduces the font size of the displayed characters. The software program also includes methods for substituting fonts in a page or file with easily readable fonts and converting lowercase characters to uppercase characters. The software program maximizes the amount of displayed text while maintaining the intended relative style and positioning of the text.

31 Claims, 9 Drawing Sheets

Constitution·of·the·United·States ¶
¶
¶  } 44    40
We·the·People·of·the·United·States,·in·Order·to·form·a·more·perfect·Union, ¶
establish·Justice,·insure·domestic·Tranquility,·provide·for·the·common ¶
defence,·promote·the·general·Welfare,·and·secure·the·Blessings·of·Liberty·to ¶
ourselves·and·our·Posterity,·do·ordain·and·establish·this·Constitution·for·the ¶
United·States·of·America. ¶

¶   } 46
Article·I· ¶

¶  ⌒ 45
→ Section·I--All·legislative·Powers·herein·granted·shall·be·vested ¶
→ in·a·Congress·of·the·United·States,·which·shall·consist·of·a·Senate ¶
→ and·House·of·Representatives. ¶

Constitution·of·the·United·States ¶
¶   } 64
We·the·People·of·the·United·States,·in·Order·to·form·a·more·perfect·Union, ¶
establish·Justice,·insure·domestic·Tranquility,·provide·for·the·common ¶
defence,·promote·the·general·Welfare,·and·secure·the·Blessings·of·Liberty·to ¶
ourselves·and·our·Posterity,·do·ordain·and·establish·this·Constitution·for·the ¶
United·States·of·America. ¶

¶  } 66
Article·I· ¶

¶  ⌒ 65
→ Section·I--All·legislative·Powers·herein·granted·shall·be·vested ¶
→ in·a·Congress·of·the·United·States,·which·shall·consist·of·a·Senate ¶
→ and·House·of·Representatives. ¶

METHODS AND APPARATUSES FOR DISPLAY AND TRAVERSING OF LINKS IN PAGE CHARACTER ARRAY

CROSS REFERENCE TO RELATED APPLICATIONS

The following copending U.S. patent applications are assigned to the assignee of the present application, and their disclosures are incorporated herein by reference:

(A) Ser. No. 09/374,223 filed Aug. 13, 1999, by Paul Mercer and originally entitled, "METHODS AND APPARATUSES FOR DISPLAY AND TRAVERSING OF LINKS IN PAGE CHARACTER ARRAY".

FIELD OF THE INVENTION

This invention relates to providing information to a display, and in particular to maximizing the amount of text displayed.

BACKGROUND OF THE INVENTION

Large amounts of information, in particular, text is viewable to users from a variety of sources. For example, users may access the internet to obtain libraries of text on remote servers or obtain text from local memory. However, the amount of text which is viewable at a given instance may be limited by the user's accessing device. In particular, the user may have an accessing device with a limited display.

For example, many devices such as handheld devices have relatively small displays for providing text to users. Typically, handheld devices are designed to be mobile, light weight, and small, which necessitates a relatively small display. A cellular telephone is an example of a handheld device having a small display. The cellular telephone's small display provides a few lines of text which may include a name and a telephone number. Large amounts of text that have a variety of fonts and formats are not easily provided on a small display.

Moreover, users of handheld devices may require more information than can be easily provided on a small display. A typical user may want to have information that requires extensive text such as weather forecasts, driving directions, and/or stock updates. This type of information generally requires numerous lines of text that may not fit on a small display. Also, the text is usually designed or formatted to be easily used and/or comprehended by users. For example, the text may have large fonts in one section or multiple line breaks in other sections for emphasizing various options for the user, and/or information in the text. For example, a user may desire to access an internet page having a variety of fonts identifying links or other usable information. When accessing this information the user would prefer to access the information having the existing formatting or the existing font sizes and spacing. However, the information or text may not be readily available, as formatted, to a small display.

In sum, large amounts of text may be obtained from remote locations, such as servers on the internet, which are accessible by a handheld device, but the amount of text provided to a user is limited by the small display of the handheld device.

Therefore, it is desirable to provide a method, device and/or an article of manufacture, such as persistent storage, having software for maximizing the amount of text provided to a display. The method, device and article of manufacture should provide text to the user in a format that is intended by the information provider while fitting the text on a small display.

SUMMARY OF THE INVENTION

A method for maximizing the amount of text provided to a display is provided. According to one embodiment of the present invention, the method is performed by a software program.

According to another embodiment of the present invention, a method for providing text to a display is provided. The displayed text includes a plurality of characters positioned in a plurality of rows. A processor readable representation of the displayed text is obtained. The vertical displayed distance between a first character in a first row and a second character in a second row is reduced.

According to another embodiment of the present invention, the representation of the displayed text is an ASCII file or a markup language page.

According to another embodiment of the present invention, the vertical displayed distance step includes the step of reducing the vertical displayed distance associated with a code in the representation of the text, wherein the code is an ASCII carriage return and line feed code. The code may also be multiple sequential tab and/or space ASCII codes.

According to another embodiment of the present invention, the code is a markup language tag.

According to another embodiment of the present invention, the reducing the vertical displayed distance step includes the step of substituting a plurality of first type codes in the representation of the text with a single first type code.

According to another embodiment of the present invention, a method for providing text to a display includes the step of reducing the horizontal displayed distance between the first character in the first row and a third character in the first row.

According to an embodiment of the present invention, the reducing the horizontal displayed distance step includes the step of reducing the horizontal display distance associated with the code in the representation of the displayed text.

According to another embodiment of the present invention, the code is a tab ASCII code.

According to an embodiment of the present invention, a method for providing text to a display includes a step of reducing a first character font size relative to a second character font size.

According to another embodiment of the present invention, the method further includes the step of substituting a first font type for a second similar font type from a predetermined group of font types.

According to another embodiment of the present invention, the method further includes the step of substituting a lowercase character with an uppercase character.

According to an embodiment of the present invention, a method for providing text to a display is provided. The displayed text includes a plurality of a characters positioned in a plurality of rows, wherein a first character in the plurality of characters has a first font size and type, and a second character in the plurality of characters has a second font size and type. The steps include obtaining a processor readable representation of the displayed text. The vertical distance between a first character in a first row and a second character in a second row is reduced. The horizontal distance between the first character and a third character in the first row is also reduced. A first character font size relative to the second character font size is similarly reduced. The first font type of a character is substituted for a second similar font type from a predetermined group of font types. A lowercase character is identified and replaced with an uppercase character.

According to another embodiment of the present invention, a cellular telephone is provided. The cellular telephone comprises a processor and display coupled to a bus. A memory is coupled to the bus and stores a software program for maximizing the amount of text provided to the cellular telephone display.

According to another embodiment of the present invention, the software program includes a vertical distance between characters reduction method, a horizontal distance between characters reduction method, a font size reduction method, and a font substitution method.

According to another embodiment of the present invention, an article of manufacture including a persistent storage device storing a software program is provided. The software program comprises a software method for obtaining information used to display text, wherein the text includes a plurality of characters having respective font sizes. The software program includes a method for proportionally reducing the font size of a character in the plurality of characters.

The drawings and text that follow describe embodiments of the invention in detail. It will be recognized that specific implementations may be carried out differently without departing from the invention as described with specificity in the appended claims. Likewise, in some cases details are not shown where one of skill in the art would recognize how to implement the described function from the description provided.

BRIEF DESCRIPTION OF THE FIGURES

The invention will be better understood with reference to the drawings and detailed description below. In the drawings, like reference numerals indicate like components.

DETAILED DESCRIPTION

Figure 1A:
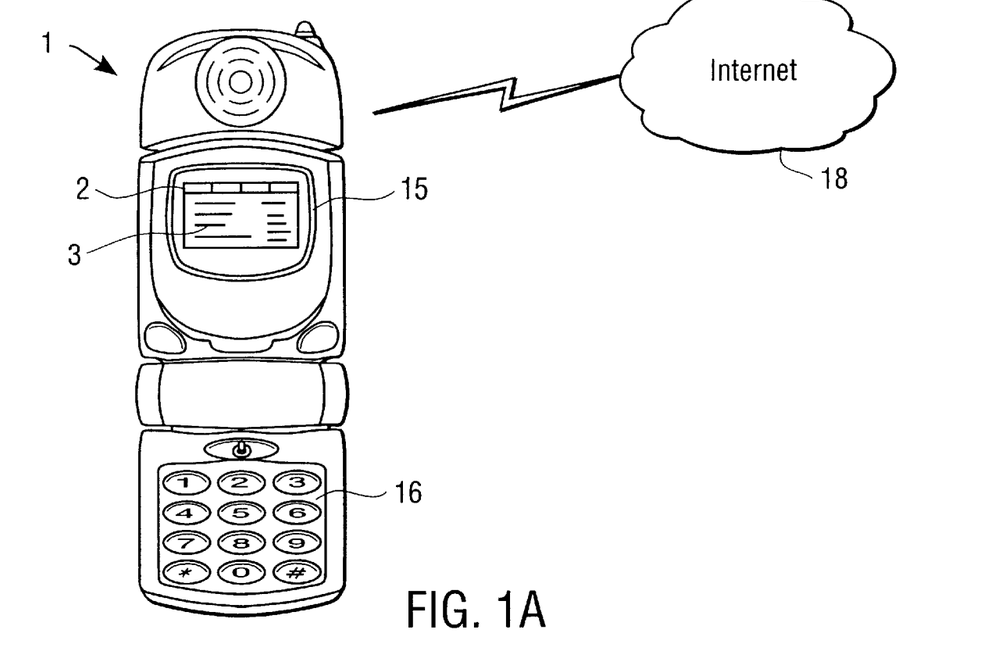
FIG. 1A illustrates a cellular telephone having software according to an embodiment of the present invention.
Figure 1B:
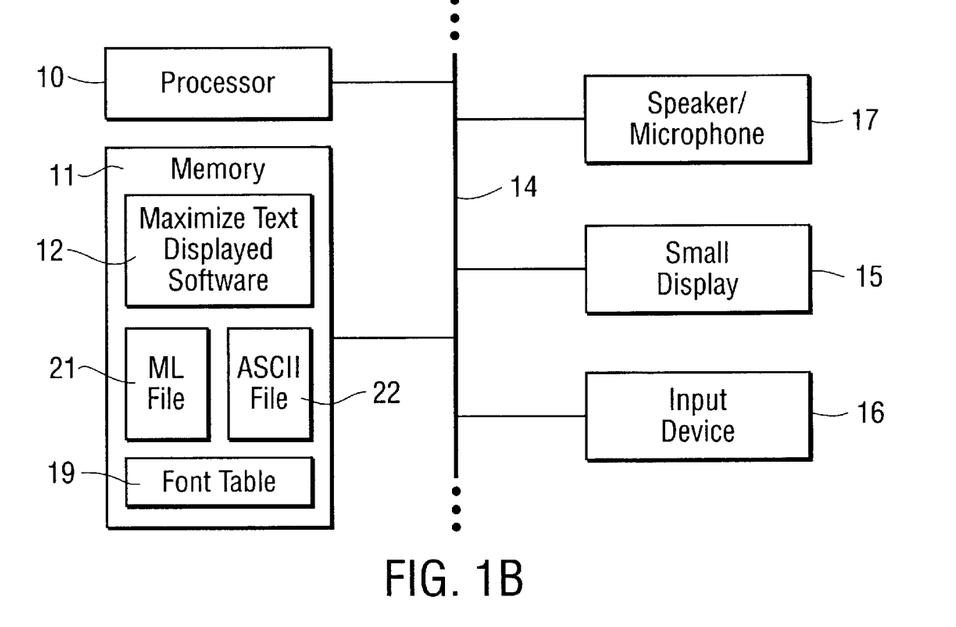
FIG. 1B illustrates a block diagram of a device according to an embodiment of the present invention.
Figure 2:
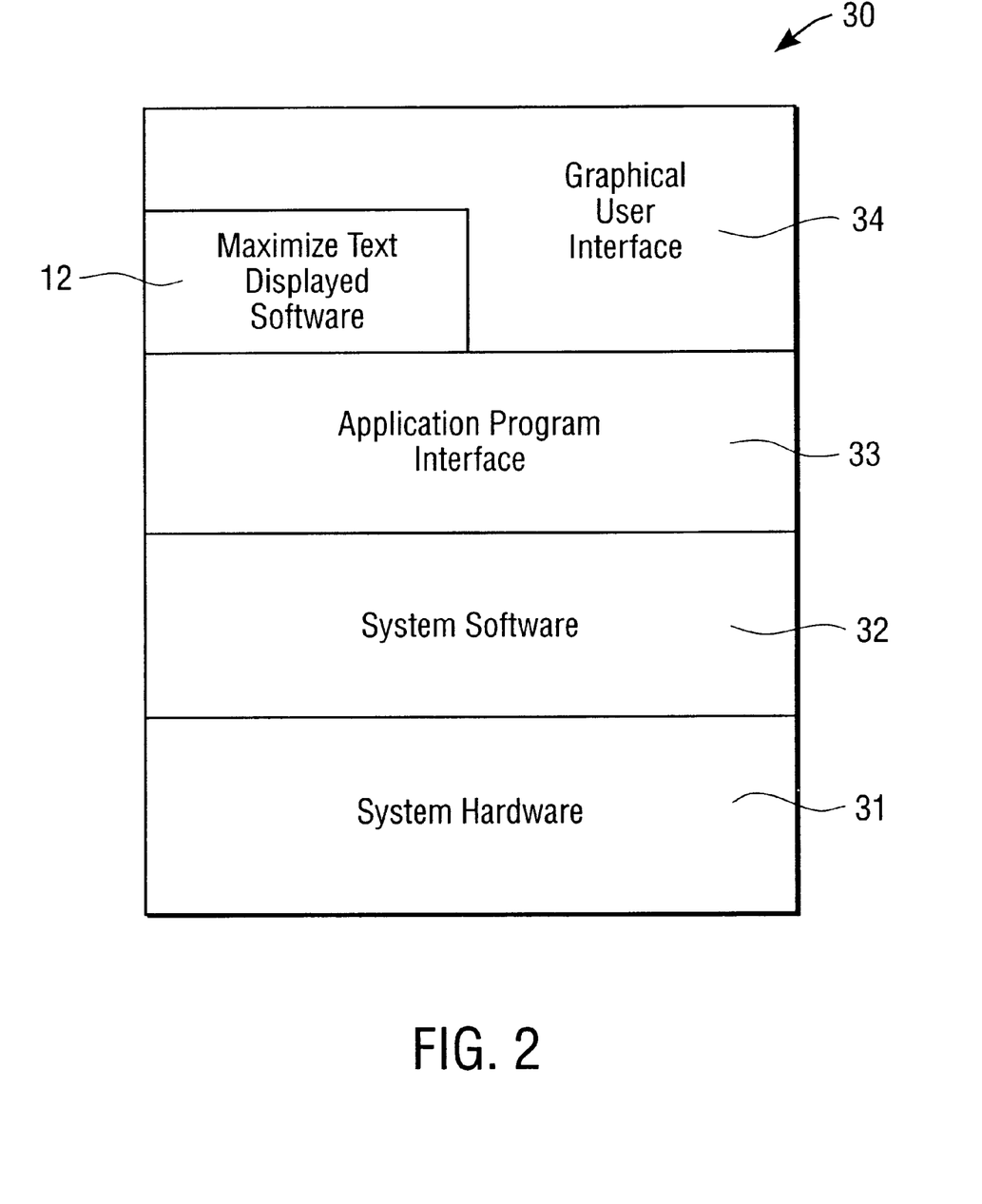
FIG. 2 illustrates a software and hardware block layer diagram according to an embodiment of the present invention.

FIGS. 1A–B and 2 illustrate a device having a display according to an embodiment of the present invention. In an embodiment, the device may be a handheld device. In particular, FIG. 1A illustrates a cellular telephone 1 having a small display 15. Cellular telephone 1 also includes input device 16 and, in particular, a numeric keypad. Display 15 provides a window 2 having text 3 according to an embodiment of the present invention. Text 3 may correspond to text 60 in FIG. 3B in an embodiment of the present invention. Cellular telephone 1 has wireless access to the world-wide-web ("www") or internet 18 and/or Wireless Access Protocol ("WAP").

While a cellular telephone embodiment of the present invention is illustrated in FIG. 1A, one of ordinary skill in the art would appreciate that many other embodiments of the present invention falls within the scope of the appended claims. For example, embodiments of the present invention may include cordless telephones, pagers, palm top computers, personal digital assistants ("PDA"), digital video disk ("DVD") players, digital cameras, printers, or an equivalent thereof. Generally, an embodiment of the present invention may include any information appliance. An information appliance is any mobile device that is designed to provide users with access to information stored on the device, or to information stored elsewhere when connected to data resources via a wired or wireless connection.

According to embodiments of the present invention, cellular telephone 1, supports wireless protocol communications, including the Global System for Mobile communications ("GSM"), Time Division Multiple Access ("TDMA"), Personal Digital Cellular ("PDC"), or Code Division Multiple Access ("CDMA"), W-CDMA or CDMA-2000.

FIG. 1B illustrates a hardware/software block diagram according to an embodiment of the present invention. A device 17 according to an embodiment of the present invention includes an electronics bus 14 for electrically coupling various device components. Ellipses are shown to identify other software and hardware components that may be present in an embodiment of the present invention. For example, device 17 may be a cellular telephone which has communication software and wireless communication hardware.

Processor 10 is coupled to bus 14. In an embodiment, processor 10 may be an embedded microprocessor such as an ARM processor, a low power 32 bit reduced instruction set computer ("RISC") processor. In another embodiment, processor 10 may be a 68000 microprocessor. In alternate embodiments, processor 10 may be a Power PC, MIPS, or X86 processor.

Memory 11 is also coupled to bus 14 and stores Maximize Text Displayed software 12 according to an embodiment of the present invention. In an embodiment, memory 11 stores a markup language file 21 or American Standard Code for Information Interchange ("ASCII") file 22. In alternate embodiments, memory 11 includes other processor readable representations of displayed text. Memory 11 also stores a font table 19 which may include a predetermined number of font types and sizes.

In embodiments, memory 11 includes read-only-memory ("ROM"), ready-access-memory ("RAM"), virtual memory or other memory technology, singly or in combination. In an embodiment, memory 11 is an approximately 100K ROM.

In an alternate embodiment, Maximize Text Displayed software 12 may be stored in a persistent storage device such as a magnetic hard disk, a floppy magnetic disk, CD-ROM or other write data storage technology, singly or in combination.

Speaker/microphone 17 is also coupled to bus 14 and is used as an audio input/output device in an embodiment of the present invention.

Input device 16 is coupled to bus 14. In an embodiment, input device 16 may be a numeric keypad or a touch sensitive screen.

Small display 15 is also coupled to bus 14. In an embodiment, small display 15 may be a bit map display having a pixel size ranging from 80×60 to 320×240. In a particular embodiment, small display 15 may have a pixel size of 160×240.

FIG. 2 illustrates a software and hardware block layer diagram 30 according to an embodiment of the present invention. System software 32 and system hardware 31 are used in connection with application program interface 33 to support a graphical user interface 34 according to an embodiment of the present invention.

System software 32 may include a real time operating system software for controlling internal operation of device 17. System software 32 may also include a web browser for accessing internet 18 over a wired or wireless connection.

In an embodiment, graphical user interface 34 is used to provide information and/or text to display 15 on cellular telephone 1 illustrated in FIG. 1A. Maximize Text Displayed software 12 is used in connection with graphical user interface software 34 to provide text to a small display 15. In an embodiment, Maximize Text Displayed software 12 alters a markup language ("ML") page 21 in order to maximize the viewable text. In an embodiment, ML page 21 is obtained from internet 18. In alternate embodiments, ML page 21 is written in HyperText Markup Language ("HTML"), Handheld Devices Markup Language ("HDML"), Wireless Markup Language ("WML"), Standard Generalized Markup Language ("SGML"), extensible Markup Language ("XML"), a combination thereof or an equivalent thereof. In an alternate embodiment, Maximize Text Displayed software 12 alters ASCII file 22 in order to maximize the viewable text on small display 15.

Figure 3A:
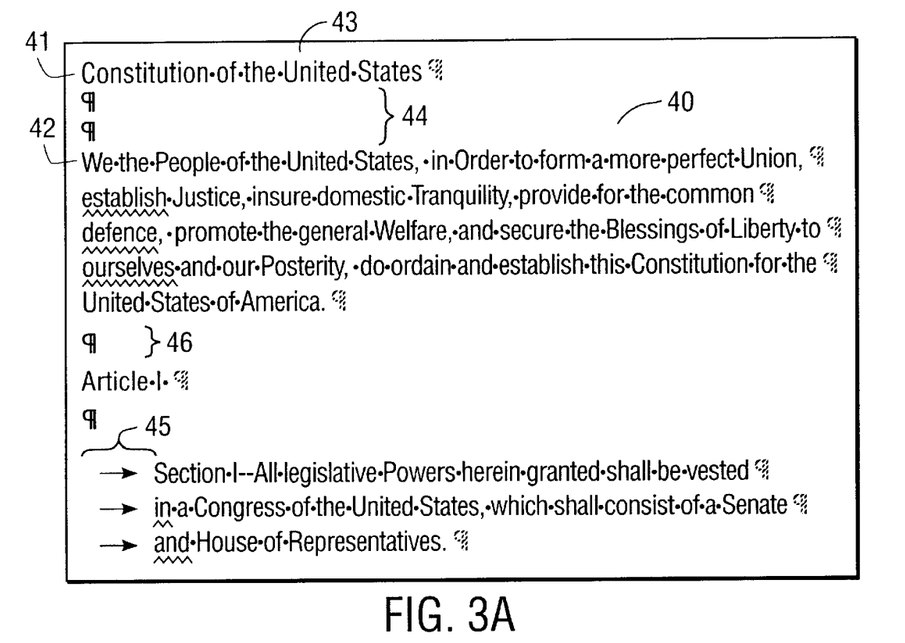
FIGS. 3A–D illustrates text and maximized displayed text according to an embodiment of the present invention.
Figure 3B:
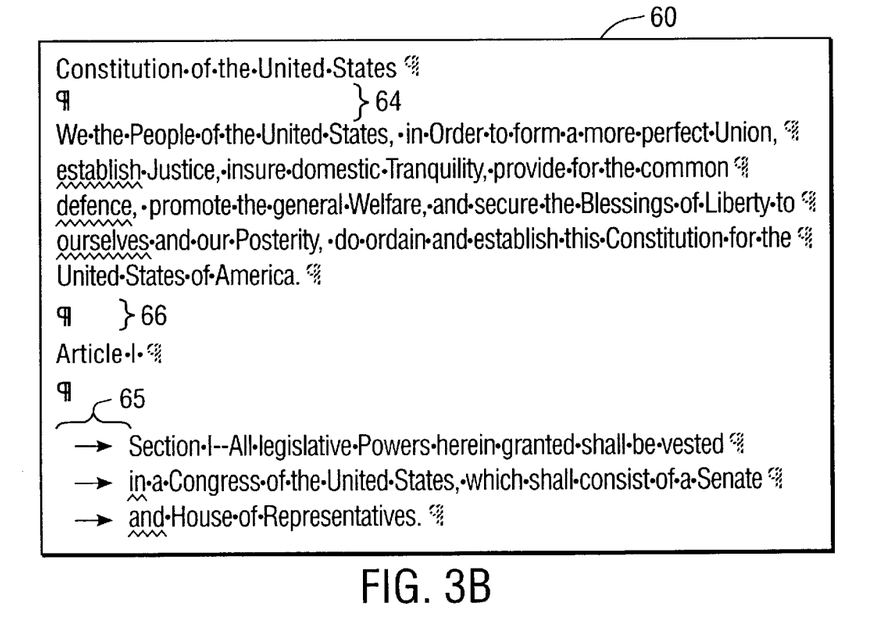
Figure 4:
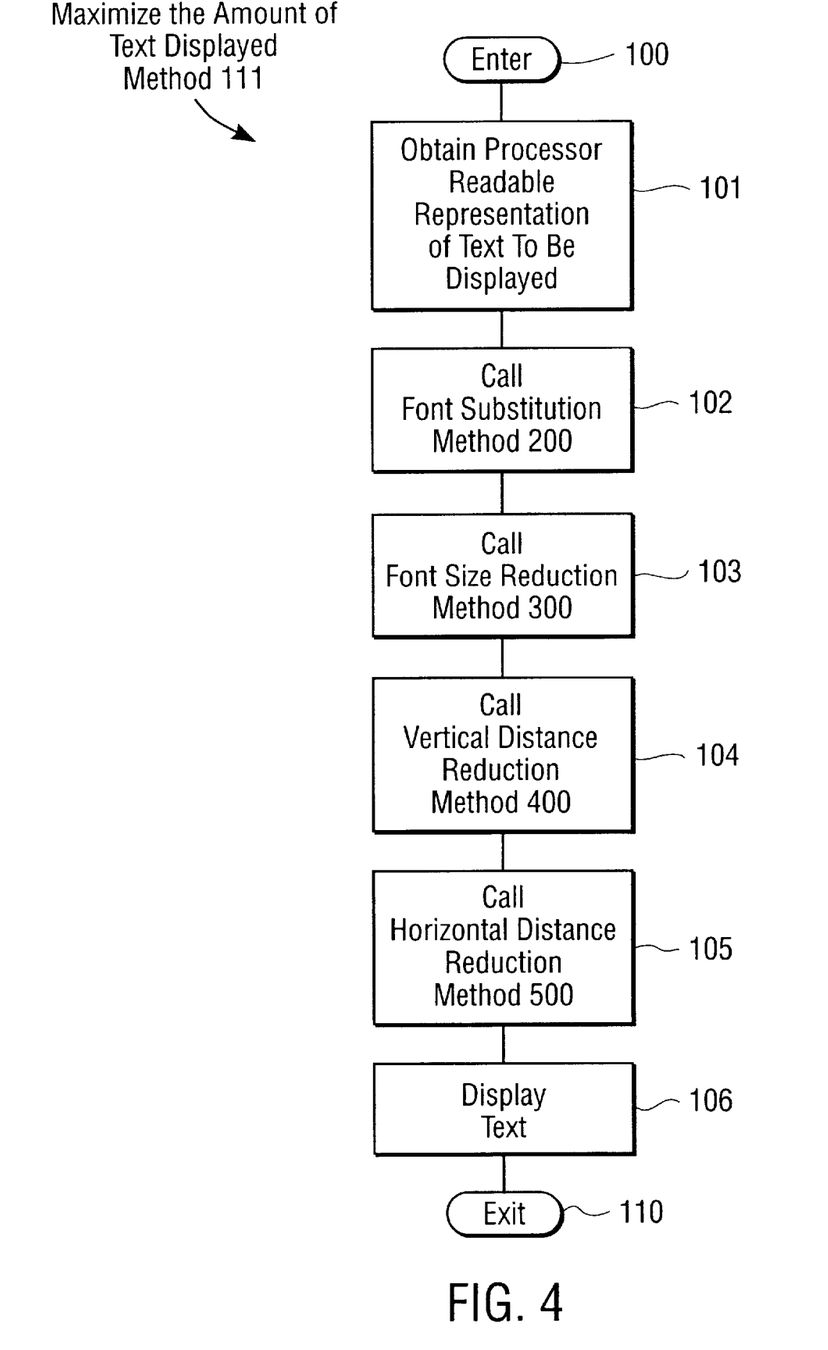
FIG. 4 illustrates a control flow diagram of a maximizing text displayed software according to an embodiment of the present invention.
Figure 7:
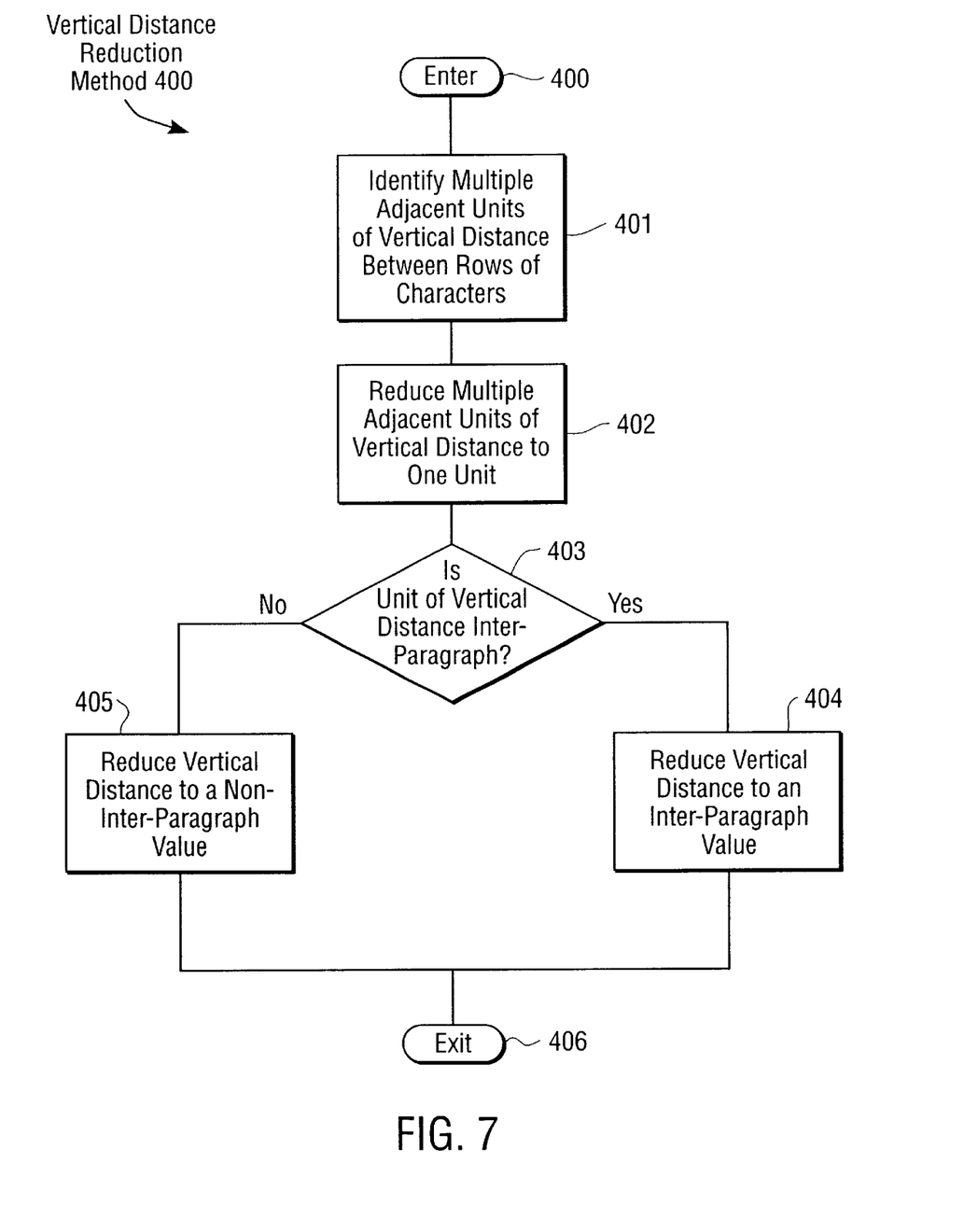
FIG. 7 illustrates an embodiment of a vertical distance reduction method identified in FIG. 4.

FIG. 3A illustrates text 40 which may be displayed using a processor readable representation, such as ML page 21 or ASCII file 22. FIG. 3B illustrates the resulting text 60 after an embodiment of Maximum Text Displayed software 12 alters a processor readable representation of text 40. In an embodiment, text 60 corresponds to text 3 illustrated in FIG. 1. For example, vertical distance reduction method 400 illustrated in FIGS. 4 and 7 is used to reduce the vertical distance between characters in text 60 as compared to text 40.

As can be seen in FIG. 3A, text 40 includes a plurality of characters, for example, character "U" identified by reference number 43. The text may include multiple rows and columns of characters. For example, text 40 includes row 41 of characters and row 42 of characters. Separating row 41 and 42 is vertical distance 44. Vertical distance 44 may be represented by different processor readable units or representations. For example, vertical distance 44 may be represented by two carriage returns and line feeds ASCII codes in an ASCII file 22. Similarly, vertical distance 44 may be represented by multiple markup language tags, such as two "<BR>" in ML file 21. Columns of characters may be seen in FIG. 3D. For example, column 74 includes "Red", "Green" and "Blue" and column 75 includes "Apple", "Banana" and "Orange".

Horizontal distance 45 illustrates the distance between a character and the left margin. Another horizontal distance 78 is illustrated in FIG. 3D between column 74 and 75. Similar to the above, horizontal distance 45 may be represented by a tab ASCII code in ASCII file 22. Likewise, horizontal distance 45 may be represented by a markup language tag, such as "<table>" in ML file 21.

While English characters are illustrated in FIGS. 3A–D, other characters could likewise be used in alternate embodiments of the present invention. For example, Chinese characters could likewise be used. A character is defined as a symbol that represents information. Furthermore, each character may have a specific font, for example, Times Roman. A font is defined as a set of type all of one size and style.

Figure 3C:
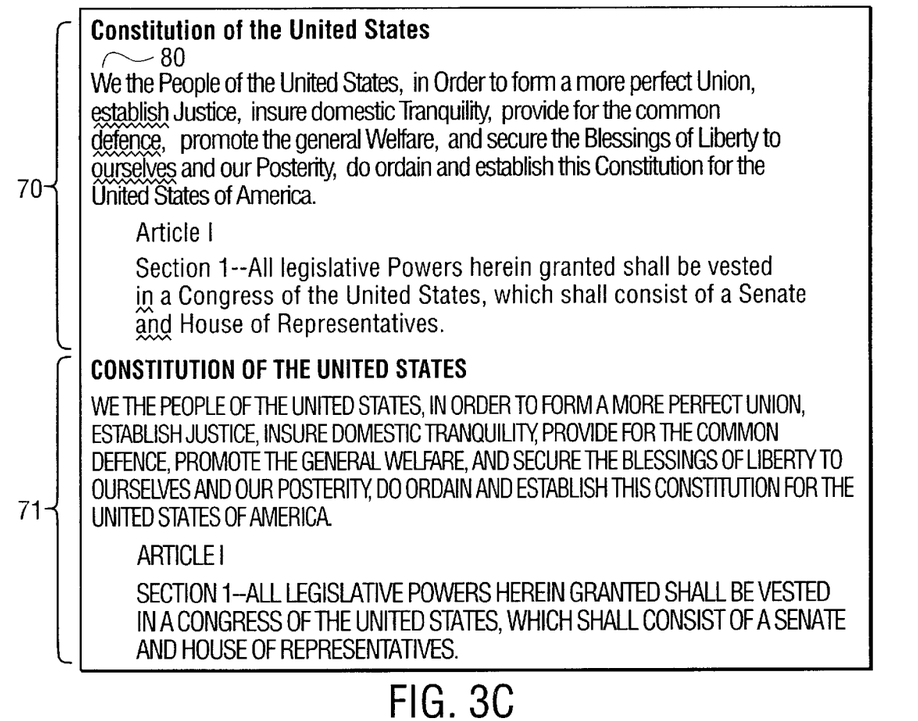
Figure 3D:
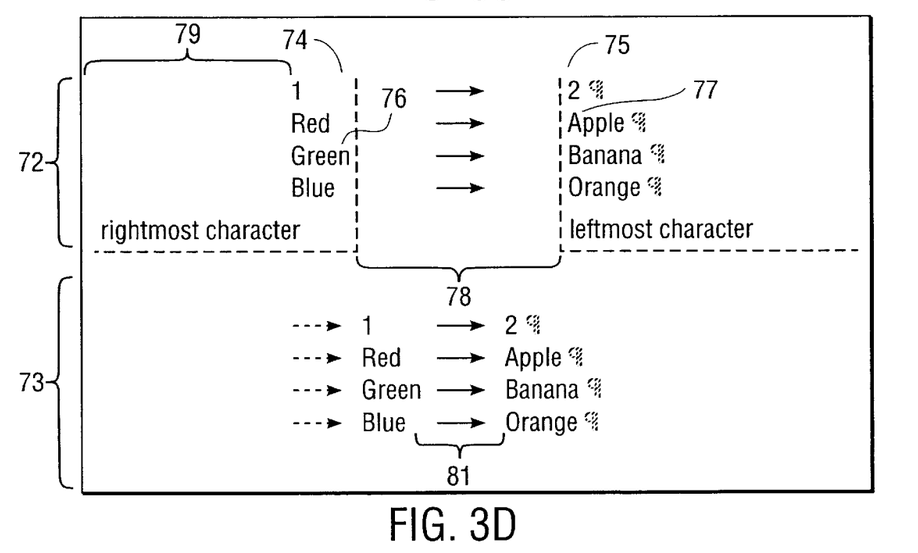
Figure 5:
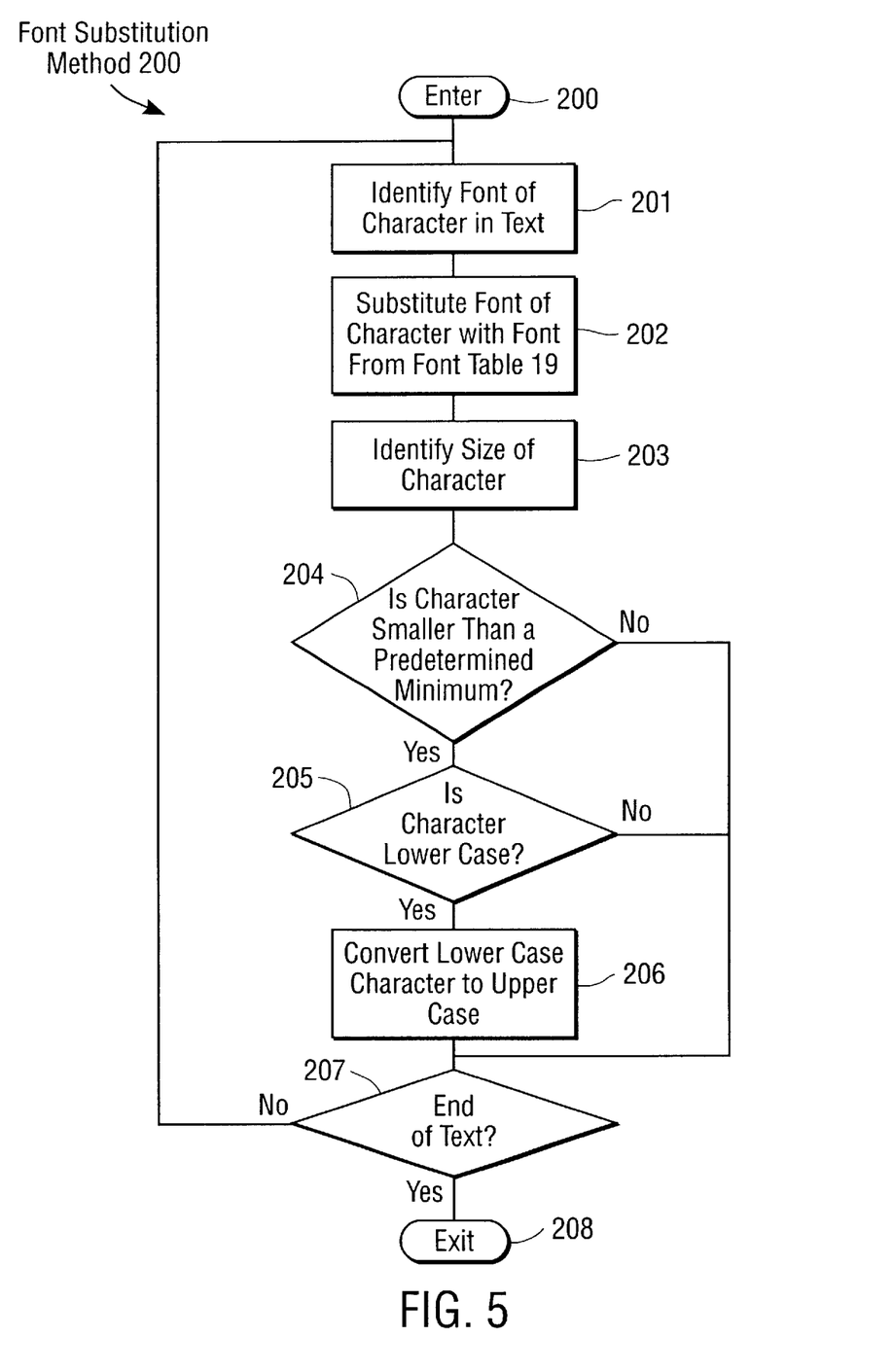
FIG. 5 illustrates an embodiment of a font substitute method identified in FIG. 4.

FIG. 3C illustrates text 70 and 71. FIG. 3C is similar to FIGS. 3A–B in that text 70 represents text before an embodiment of Maximize Text Displayed software 12 is used to alter a processor readable representation of the text used to display text 71. For example, font substitution method 200, as shown in FIGS. 4 and 5, are used to alter ML page 21 or ASCII file 22. As can be seen, text 71 is similar to text 70, but the lowercase characters are substituted with uppercase characters. Further details of font substitution method 200 are described below.

Figure 8:
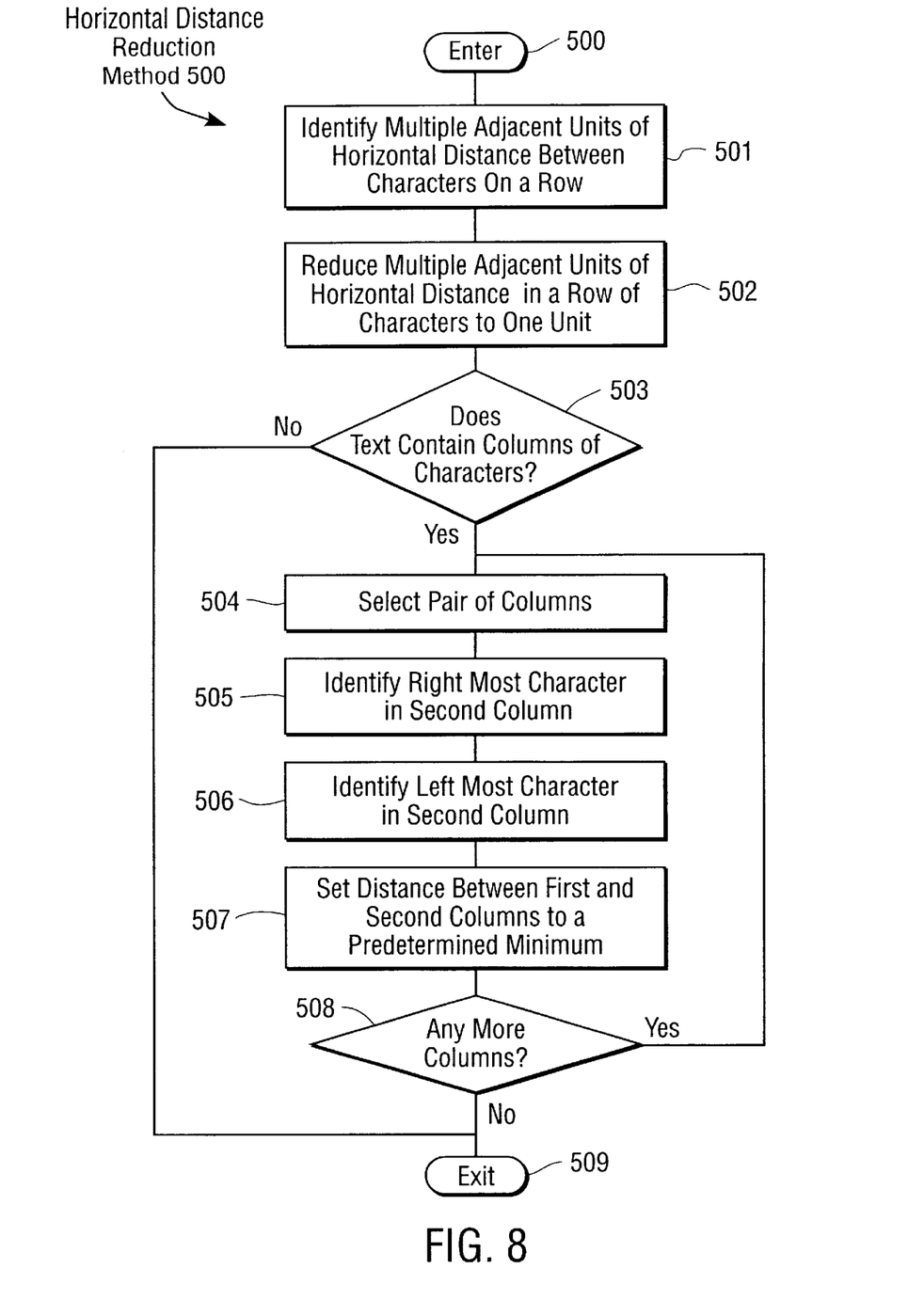
FIG. 8 illustrates an embodiment of a horizontal distance reduction method identified in FIG. 4.

FIG. 3D, similar to FIG. 3C, illustrates text 72 having columns of characters 74 and 75. Column 74 is separated from the left margin by horizontal distance 79. Column 74 and 75 are separated by horizontal distance 78. In an embodiment, Maximize Text Displayed software 12 is used to alter a processor readable representation of the text used to display text 73. For example, horizontal distance reduction method 500, illustrated in FIGS. 4 and 8, is used to reduce the horizontal distances 79 and 78 in text 72.

It should be understood by one of ordinary skill in the art that the following flow charts are used to illustrate the logical functions of software code of Maximize Text Displayed software 12. In alternate embodiments, various identified logical functions or software code may be excluded. Likewise, in alternate embodiments, additional logical functions or software code may be added. The preferred sequence of logical functions or execution of code is described below, while alternate embodiments may include different sequences.

FIG. 4 illustrates a control flow diagram representing the execution of Maximize Text Displayed software 12. In an embodiment, maximize the amount of text displayed method 111 is executed by processor 10 in cellular telephone 1 to display text 3. After entering method 111, as illustrated by a logical circle 100, a processor readable representation of text to be displayed is obtained as illustrated by logic block 101. As described above, the representation of text may be ASCII file 22. In an alternate embodiment, the representation of text may be ML page 21. In an embodiment, the representation of text may be obtained over a wired or wireless internet connection. The representation of text is obtained from memory 11 in an embodiment. After obtaining the representation of text to be displayed, a font substitution method 200 is called as illustrated by logic block 102. An embodiment of a font substitution method 200 is illustrated in FIG. 5 and described below. An embodiment of a font substitution method 200 is used to alter a processor readable file used to display text 60 in FIG. 3B.

Figure 6:
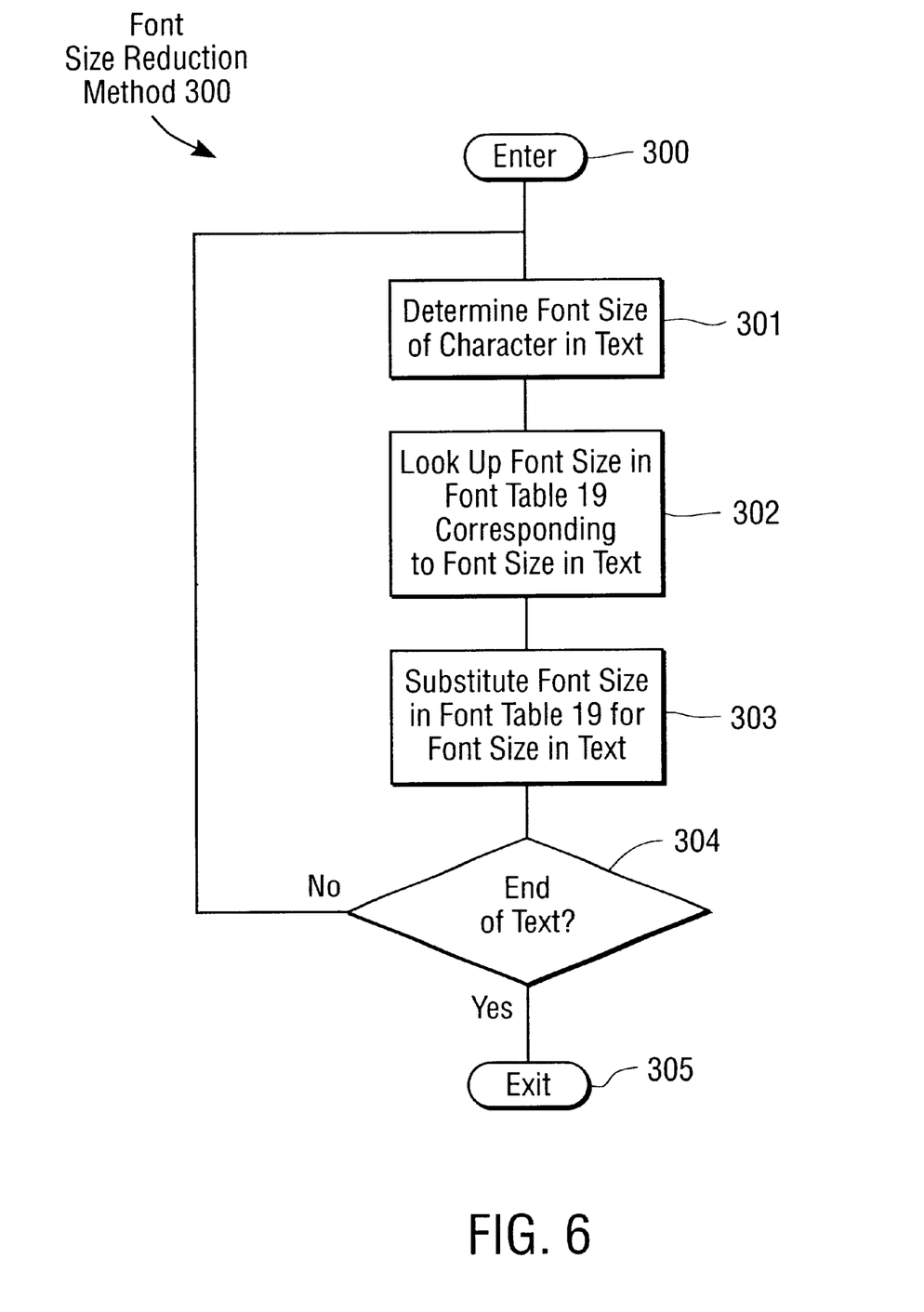
FIG. 6 illustrates an embodiment of a font size reduction method identified in FIG. 4.

After logical block 102, a font size reduction method 300 is called as illustrated by logic block 103. A font size reduction method 300 is illustrated in FIG. 6 and described in detail below.

Next, a vertical distance reduction method 400 is called as illustrated by logic block 104. A vertical distance reduction method 400 is illustrated in FIG. 7 and described in detail below. Next, a horizontal distance reduction method 500 as illustrated by logic block 105 is called. An embodiment of a horizontal distance reduction method 500 is illustrated in FIG. 8 and described in detail below. The text is then provided to display 15 using the altered processor readable representation of the text, as illustrated by logic block 106. Method 111 exits as illustrated by circular logic 110.

FIG. 5 illustrates a font substitution method 200 identified in FIG. 4. After entering font substitution method 200, as illustrated by logic circle 200, the font of a character in the text is identified as illustrated by logic block 201. For example, the font of letter "U" (reference number 43) as seen in FIG. 3A is determined. After a determination of the font type, a substitute font may be replaced using the font table 19, as illustrated by logic block 202. Font table 19 includes a lookup table for mapping difficult to view fonts to easily readable fonts. For example, an Arial font will be replaced with a Helvetica font which is much more easily readable on a small display. The size of the character is then identified in logic block 203. For example, the pixel size of letter "W" (reference number 80) as seen in FIG. 3C, is determined to be 5 pixels high. Next, a determination is made whether the character is smaller than a predetermined minimum, as illustrated by logic block 204. In an embodiment of the present invention, the predetermined minimum is 5 pixels high. If the identified character is not smaller than a predetermined limit, control of the program transfers to logic block 207. A determination is then made in logic block 207 whether you are at the end of the text. If you are not at the end of the text, the program loops back to logic block 201 and repeats. Otherwise, the font substitution method 200 exits as illustrated by circular logic 208. If the character is smaller than the predetermined minimum, a determination is made whether the character is lowercase, as illustrated by logic block 205. If the character is not lowercase, control transfers to logic block 207. Otherwise, the lowercase character is converted to an uppercase character, as illustrated by logic block 206.

FIG. 3C illustrates an example where a processor readable representation of text 70 which includes lowercase characters is altered to a processor readable representation used to display text 71 having all substituted uppercase characters. The all uppercase version of text 71 enhances user readability. Also, as can be seen, text 71 is displayed with a processor readable representation altered by an embodiment of the vertical distance reduction method 400 and the horizontal distance reduction method 500.

FIG. 6 illustrates a font size reduction method 300 as identified in FIG. 4. Method 300 is entered as illustrated by circular logic 300. A determination is made of a the font size of a character in a processor readable representation of text. For example, character "U" in text 40 may have a small font size in a corresponding ML page 21. In an embodiment, ML page 21 includes characters having a 12, 14 or 18 font size tags. An assigned pixel size character corresponding to the size tags would be obtained as illustrated by logic block 302 and substituted as illustrated in logic block 303. For example, a 5 pixel sized character would be substituted for a 12 font character; a 6 pixel sized character would be substituted for a 14 font character; and a 7 pixel sized character would be substituted for a 18 font character. Other embodiments include assigning and substituting a particular pixel size character for a characters having a range of pixel sizes. For example, all characters having pixel sizes between 9 and 12 would be assigned a 5 pixel size character; and all characters having pixel sizes between 13 and above would be assigned a 7 pixel size character.

A determination is made whether the character is the last character in the processor readable representation of text as illustrated by logic block 304. If the character is the last character, method 300 exits as illustrated by circular logic 305. Otherwise, the logical functions repeat.

FIG. 7 illustrates a vertical distance reduction method 400 as identified in FIG. 4. Method 400 is entered as illustrated by circular logic 400. Multiple adjacent units of vertical distance between rows of characters in a processor readable representation of text are identified as illustrated by logic block 401. As described above, a unit of vertical distance between rows of characters may be a carriage return and line feed ASCII code in ASCII file 22. In an alternate embodiment, a unit of vertical distance between rows of characters may be multiple sequential tab and/or space ASCII codes causing line breaks. Similarly, a unit of vertical distance may also include markup language tag, such as "<BR>", in ML page 21. As seen in FIGS. 3A–B, vertical distance 44 in text 40 is transformed into a reduced vertical distance 64 in text 60.

Next, multiple adjacent units of vertical distance are reduces to a single unit. For example, software 12 replaces multiple adjacent carriage return and line feed ASCII codes in ASCII file 22 with a single carriage return and line feed ASCII code. In alternate embodiments, the number of units may be divided by a predetermined number, such as 2. The number of multiple adjacent units is stored so as to be used in calculating the reduced vertical distance as illustrated in logic blocks 405 and 404 below. In an alternate embodiment, the size of font would be used to calculate the vertical distance as illustrated in logic blocks 405 and 404 below.

After replacement of multiple adjacent units of vertical distance with one unit, a decision is made whether the unit of vertical distance is inter-paragraph. In other words, a decision is made whether the unit of vertical distance is positioned between adjacent rows of characters in a paragraph as illustrated by logic block 403. If so, the vertical distance is reduced to an inter-paragraph value corresponding to a smaller distance between the adjacent rows of characters in a paragraph, as illustrated in logic block 404. Otherwise, the vertical distance is reduced to a non interparagraph value corresponding to a non inter-paragraph distance, such as a distance between paragraphs. In an embodiment, the inter-paragraph value is less than the non inter-paragraph value. The vertical distance for reduction method 400 then exits as illustrated by logic circle 406.

FIG. 8 illustrates horizontal distance reduction method 500 as identified in FIG. 4. Horizontal distance reduction method 500 is entered as illustrated by circular logic 500. Multiple adjacent units of horizontal distance between characters on a row are identified as illustrated by logic block 501. For example, if multiple ASCII space codes are inserted between words, these multiple spaces will be identified in logic block 501. The multiple adjacent units of horizontal distances in a row of characters is then reduced to one unit, as illustrated by logic block 502. For example, the multiple space ASCII codes are reduced to one space ASCII code in a ASCII file 22. In an alternate embodiment, the multiple space ASCII codes may be divided by a predetermined number, such as 2. In an alternate embodiment, the adjacent multiple horizontal units may be multiple adjacent horizontal tab ASCII codes.

A determination is then made whether the text file contains columns of characters as illustrated by logic block 503. If the text does not contain columns of characters, control is passed to circular logic 509 and horizontal distance reduction method 500 exits. Otherwise, a pair of columns are selected as illustrated by logic block 504. For example, column 74 and 75 in FIG. 3D are selected. The rightmost character in the first column is identified as illustrated by logic block 505. For example, the character "n" (reference number 76) is identified. Next, the leftmost character in the second column is identified as illustrated by logic block. For example, the "A" in column 75 (reference number 77) is identified. The distance between a first and second column is set to a predetermined minimum as illustrated by logic block 507. For example, the tab ASCII code in a ASCII file 22 which represents the distance 78 in text 72 of FIG. 3D is substituted for the predetermined minimum, which results in a distance 81 in text 73. A determination is made whether there are any more pairs of columns as illustrated in logic block 508. If there are more columns, control passes back to logic block 504 and repeats. Otherwise, horizontal distance reduction method 500 exits as illustrated by logic block 509.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for providing text to a display of a mobile device, wherein the displayed text includes a plurality of characters positioned in a plurality of rows, comprising the steps of:

obtaining a representation of the displayed text;

reducing a first vertical displayed distance between a first character in a first row of the plurality of rows and a second character in a second row of the plurality of rows;

reducing a second vertical displayed distance between the second character in the second row of the plurality of rows and a third character in a third row of the plurality of rows, wherein the first vertical displayed distance is less than the second vertical displayed distance.

2. The method of claim 1, wherein the representation of the displayed text is an ASCII file.

3. The method of claim 1, wherein the representation of the displayed text is a markup language page.

4. The method of claim 1, wherein the reducing the first vertical displayed distance step includes the step of:

reducing the first vertical displayed distance associated with a code in the representation of the text.

5. The method of claim 4, wherein the code is an ASCII carriage return and line break code.

6. The method of claim 4, wherein the code is a markup language tag.

7. The method of claim 1, wherein the reducing the second vertical displayed distance step includes the step of:

substituting a plurality of first type codes in the representation of the text with a single first type code.

8. The method of claim 1, further comprising the step of:

reducing the horizontal displayed distance between the first character in the first row and a third character in the first row.

9. The method of claim 8, wherein the reducing the horizontal distance step includes the step of:

reducing the horizontal displayed distance associated with a code in the representation of the displayed text.

10. The method of claim 9, wherein the code is a tab ASCII code.

11. The method of claim 9, wherein the code is a space ASCII code.

12. The method of claim 9, wherein the first character is in a first column and the third character is in a second column.

13. The method of claim 1, further comprising the step of:

reducing the horizontal distance displayed between a rightmost character in a first column and a leftmost character in a second column.

14. The method of claim 1, further comprising the step of:

reducing the horizontal distance displayed between a leftmost character in a first column and a rightmost character in a second column.

15. The method of claim 1, wherein the first character has a first font size and the second character has a second font size, further comprising the step of:

reducing the first character font size relative to the second character font size.

16. The method of claim 1, wherein the first character has a first type of font, further comprising the step of:

substituting the first font type for a second similar font type from a predetermined group of font types.

17. The method of claim 16, wherein the second similar font type includes the same bold, italicize and size characteristics of the first font type.

18. The method of claim 1, wherein the plurality of characters includes a lower case character, comprising the step of:

substituting the lowercase character for an uppercase character.

19. The method of claim 1, wherein the step of reducing the first vertical displayed distance reduces the overall size of the representation of displayed text; and, the method of claim 1 further comprising the step of:

providing the reduced size representation of the text to the display of the mobile device subsequent to the step of reducing.

20. The method of claim 1, wherein the mobile device is a wireless telephone.

21. A method for providing text to a display, wherein the displayed text includes a plurality of characters positioned in a plurality of rows, comprising the steps of:

obtaining a representation of the displayed text;

reducing the vertical displayed distance associated with a code in the representation of the text between a first character in a first row of the plurality of rows and a second character in a second row of the plurality of rows, wherein the first and the second row of characters is in a first paragraph and a third row of characters is in a second adjacent paragraph, wherein reducing the vertical display distance includes the steps of:

reducing a first vertical display distance between the first row and the second row; and, reducing a second vertical display distance between the second and the third row, wherein the first vertical display distance is less than the second vertical display distance.

22. An article of manufacture including a persistent storage device containing a software program, comprising:

a software method for obtaining information used to display text on a display of a mobile device, wherein the text includes a plurality of characters having respective font sizes;

a software program for reducing a first displayed distance between a first character in the plurality of characters positioned in a first row and a second character in the plurality of characters positioned in a second row; and, a second software program for reducing a second displayed distance between the second character in the plurality of characters positioned in the second row and a third character in the plurality of characters positioned in a third row, wherein the first vertical displayed distance is less than the second vertical displayed distance.

23. The article of manufacture of claim 22, wherein the information is at least a portion of a markup language page.

24. The article of manufacture of claim 22, wherein the information is at least a portion of an ASCII file.

25. The article of manufacture of claim 22, further comprising:

a software method for proportionally reducing the font size of a character in the plurality of characters.

26. The article of manufacture of claim 22, wherein the software program for reducing the displayed distance between the first and the second characters comprises:

a software method for reducing the number of adjacent line break ("<BR>") language tags in the information.

27. The article of manufacture of claim 22, wherein the software program for reducing the displayed distance between the first and the second characters comprises:

a software method for reducing the number of adjacent carriage return and line feed ASCII codes in the information.

28. The article of manufacture of claim 22, wherein the software program for reducing the distance between the first character and the second character comprises:

a software method for reducing the number of tab ASCII codes in the information.

29. The article of manufacture of claim 28, wherein the plurality of characters includes a character having a first font type, further comprising:

a software method for substituting the first font type with a second similar font type.

30. The article of manufacture of claim 22, wherein the plurality of characters includes a lowercase character, further comprising:

a software method for substituting the lowercase character with an uppercase character.

31. The article of manufacture of claim 22, wherein the mobile device is a wireless telephone.

\* \* \* \* \*

UNITED STATES PATENT AND TRADEMARK OFFICE
CERTIFICATE OF CORRECTION

PATENT NO. : 6,547,830 B1
DATED : April 15, 2003
INVENTOR(S) : Paul Mercer

It is certified that error appears in the above-identified patent and that said Letters Patent is hereby corrected as shown below:

<u>Title page,</u>
Item [54], Title, should be -- METHOD, AND ARTICLE OF MANUFACTURE FOR MAXIMIZING THE AMOUNT OF TEXT DISPLAYED --

<u>Column 10,</u>
Line 63, delete ":" and insert therefor -- ; --

<u>Column 12,</u>
Line 9, delete "claim 28" and insert therefor -- claim 22 --

Signed and Sealed this

Tenth Day of February, 2004

JON W. DUDAS
*Acting Director of the United States Patent and Trademark Office*